July 4, 1939.  G. AMMENDOLA  2,165,120
TUBE CLEANING DEVICE
Filed Aug. 3, 1937
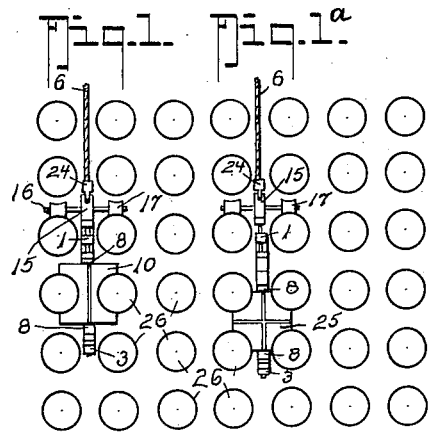
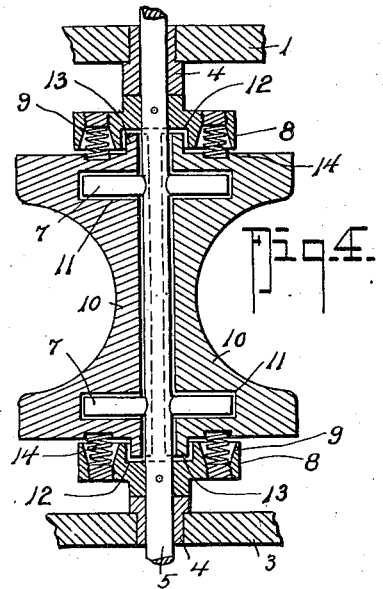
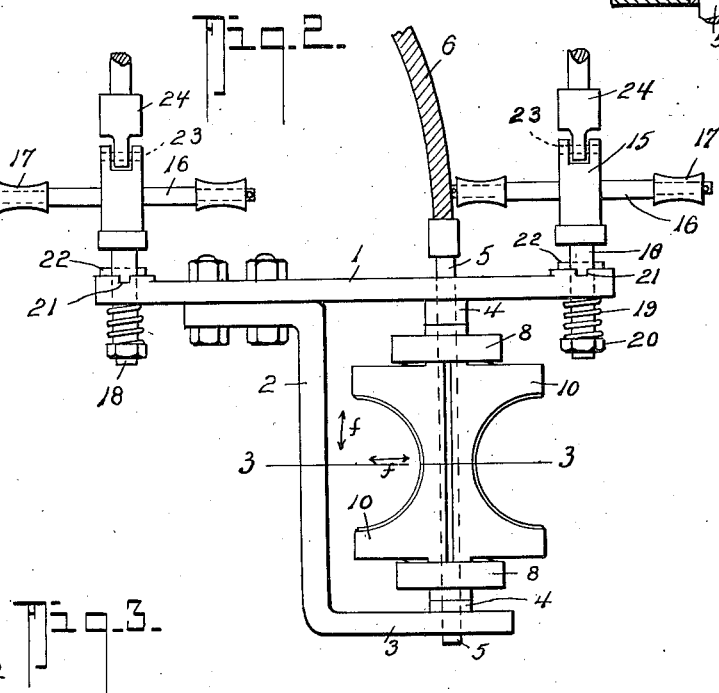
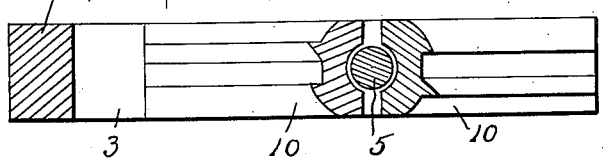
Inventor
Giuseppe Ammendola
By B. Singer
Attorney.

Patented July 4, 1939

2,165,120

UNITED STATES PATENT OFFICE 2,165,120

TUBE CLEANING DEVICE

Giuseppe Ammendola, Trieste, Italy

Application August 3, 1937, Serial No. 157,214
In Italy September 25, 1936

4 Claims. (Cl. 29—81)

My invention relates to apparatus, devices or machines for scraping incrustations from the outer surfaces of boiler flue-tubes, and it particularly has for its object to provide such a machine which will be simple in construction and effective in operation, and which can be manufactured at low cost.

In the drawing, Figs. 1 and 1ª are diagrammatic views showing a plurality of boiler tubes and the methods of applying the invention thereto.

Fig. 2 is a side elevation of the apparatus, the roller drive being turned to a position 90° from the operating position.

Fig. 3 is an enlarged section on the line 3—3 of Fig. 2.

Fig. 4 is an enlarged detail view of a portion of the apparatus.

The machine or apparatus comprising the present invention comprises a frame consisting of a bar 1 and a bracket 2 having a foot 3 that parallels the bar 1. The bar and foot have aligned bearing bushes 4 in which the shaft 5 turns, the shaft 5 being driven by any suitable power device, such as an electric motor (not shown) through a flexible driving shaft 6.

The shaft 5 has a pair of cross pins 7 which lie in holes or recesses 11 in the blades or scraper wings 10. The blades or wings 10 are arranged radially of the shaft 5 and the pin and hole connections with the shaft are such that these blades and wings may move radially, as well as axially of the shaft 5. The wings also have projections 13 which enter recesses 12 in the bars 8 that are pinned or otherwise secured to the shaft 5 to turn with the same. The recesses are made sufficiently large to give the projections the required freedom of motion in a radial, as well as in an axial direction.

The bars or arms 8 have tapered recesses 9 for the springs 14 which keep the blades 10 floating between the arms 8 and continuously tend to keep them in their position adjacent shaft 5. The blades can move in the direction of the arrows f in Fig. 2.

Swivelly mounted at either end of the bar 1 is a shaft 18 carrying beneath the bar 1, a nut 20 and a spring 19, and above the bar being provided with a head 15 and a cross pin 22 to seat in notches 21 when the machine is working.

Handles 24 are connected at 23 with the heads 15 and are used to push and pull the machine along the tubes.

In Figs. 1 and 2 I have diagrammatically shown the embodiment of the invention using blades with semi-circular scraping edges, while in Fig. 1ª are shown four blades, each with a 90° cutting edge. The apparatus of Fig. 2 can easily be designed to use quarter-cutting or scraping surface blades 25 (see Fig. 1ª) instead of half-cutting or scraping surface blades, but as such modification is well within the skill of an artizan and involves only changes in design (form and proportions of parts) further disclosure is thought unnecessary.

In operation the arms 16 are set crosswise of bar 1 (see Fig. 1) with the rollers 17 riding on a pair of tubes 26 and the shaft 5 is rotated. Centrifugal force will move the blades 10 radially outward within the limits of the recesses 12 so as to strike the tubes 26 with sufficient force to dislodge scale, while the rotational force will cause the blades also to effect a scraping action on the tubes. The floating character of the blades will allow them to rise and fall as may be necessary to accommodate them to the irregularities of the tubes.

The shaft 5, instead of being driven by a motor, may be turned by hand, in which case suitable coil springs (not shown) would be placed on the pins 7 in the recesses 11 to force the blades outwardly from the shaft and thereby aid the centrifugal force.

I do not wish to be limited to the exact construction shown, but modifications within the spirit of the invention and the scope of the appended claims will be obvious to those skilled in the art to which it appertains.

What I claim is:

1. In a portable boiler-tube scraping apparatus, a narrow carriage designed to be movable along between two rows of tubes and including a longitudinal bar and a bracket arm carrying heads mounted at the ends of said bar, and each including a cross arm with rollers to ride on the tubes, and a rotary tube cleaner journalled in bearings in said bar and bracket, said cleaner comprising a rotatable shaft, scraper blades mounted on said shaft for limited movement radially and longitudinally thereof.

2. In a portable boiler-tube scraping apparatus, a narrow carriage designed to be movable along between two rows of tubes and including a longitudinal bar and a bracket arm carrying heads mounted at the ends of said bar, and each including a cross arm with rollers to ride on the tubes, and a rotary tube cleaner journalled in bearings in said bar and bracket, said cleaner comprising a rotatable shaft and scraper blades resiliently mounted on said shaft for limited movement radially and longitudinally thereof.

3. In a portable boiler-tube scraping apparatus, a narrow carriage designed to be movable along between two rows of tubes and including a longitudinal bar and a bracket arm carrying heads mounted at the ends of said bar, and each including a cross arm with rollers to ride on the tubes, and a rotary tube cleaner journalled in bearings in said bar and bracket, said cleaner comprising a rotatable shaft and scraper blades mounted on said shaft for limited movement radially and longitudinally thereof, said shaft having cross pins and said blades having recesses to receive said pins.

4. Apparatus of the character described, comprising, a carriage frame, a rotatable shaft journalled in bearings in said frame, upper and lower bars carried by said shaft and having spring-receiving recesses, cross pins carried by said shaft, radial blades located adjacent said shaft and between said upper and lower bars, springs in said recesses to engage the tops and bottoms of said blades, said blades having recesses loosely to receive said cross pins by virtue of which said blades are floatingly held to turn with said shaft, means to limit the outward radial movement of said blades under centrifugal force, and means to support said frame from and between adjacent rows of boiler tubes, said blades having curved surfaces to conform approximately to the boiler tube curvatures.

GIUSEPPE AMMENDOLA.